United States Patent
Walker et al.

(10) Patent No.: US 7,493,267 B1
(45) Date of Patent: Feb. 17, 2009

(54) METHOD AND APPARATUS FOR COMPENSATING PARTICIPATION IN MARKETING RESEARCH

(75) Inventors: Jay S. Walker, Ridgefield, CT (US); James A. Jorasch, Stamford, CT (US); Daniel E. Tedesco, Westport, CT (US); John M. Packes, Jr., Hawthorne, NY (US); Geoffrey M. Gelman, Stamford, CT (US); Peter Kim, Stamford, CT (US); Andrew P. Golden, New York, NY (US); Timothy A. Palmer, Stamford, CT (US); Steven M. Santisi, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 1011 days.

(21) Appl. No.: 09/609,147

(22) Filed: Jun. 30, 2000

Related U.S. Application Data

(60) Provisional application No. 60/201,134, filed on May 2, 2000.

(51) Int. Cl.
*G06Q 30/00* (2006.01)
(52) U.S. Cl. .............................. 705/14; 463/20; 463/21
(58) Field of Classification Search ................... 705/1, 705/14; 463/16, 20, 22
See application file for complete search history.

(56) References Cited

U.S. PATENT DOCUMENTS

| | | | | |
|---|---|---|---|---|
| 3,750,829 A | * | 8/1973 | Jennings ........................ 221/8 |
| 4,876,592 A | | 10/1989 | Von Kohorn ................. 358/84 |
| 4,964,638 A | * | 10/1990 | Ishida ........................ 463/27 |
| 5,090,734 A | * | 2/1992 | Dyer et al. .................... 283/67 |
| 5,231,568 A | | 7/1993 | Cohen et al. ................. 364/401 |
| 5,249,800 A | | 10/1993 | Hilgendorf et al. ....... 273/138 A |
| 5,259,613 A | | 11/1993 | Marnell, II .............. 273/138 A |
| 5,280,909 A | | 1/1994 | Tracy ...................... 273/138 A |
| 5,283,734 A | | 2/1994 | Von Kohorn ................. 364/412 |

(Continued)

FOREIGN PATENT DOCUMENTS

WO    WO 99/45508    9/1999

(Continued)

OTHER PUBLICATIONS

"Royal Bank Acquires CSI" Jul. 7, 1999; Financial News; Canada News Wire.

(Continued)

*Primary Examiner*—Jeffrey D. Carlson
(74) *Attorney, Agent, or Firm*—Walker Digital Management, LLC

(57) ABSTRACT

A method for gathering marketing information from a player including transmitting a marketing question to a player proximate in space to a compensation dispensing machine, receiving a response to the marketing question from the player, and transmitting a signal to the compensation dispensing machine providing compensation to the player. The signal can be transmitted proximate in time to receiving the response. Alternatively, the method for gathering marketing information from a player can include transmitting a marketing question to a player, receiving a response to the marketing question from the player, and transmitting a signal causing a compensation dispensing machine to provide compensation to the player at a time proximate to receipt of the response. The compensation dispensing machine can be proximate in space to the player.

34 Claims, 12 Drawing Sheets

U.S. PATENT DOCUMENTS

| | | | | |
|---|---|---|---|---|
| 5,373,440 | A | * | 12/1994 | Cohen et al. .................. 705/14 |
| 5,374,952 | A | | 12/1994 | Flohr ......................... 348/12 |
| 5,429,361 | A | | 7/1995 | Raven et al. ............ 273/138 A |
| 5,470,079 | A | | 11/1995 | LeStrange et al. ....... 273/138 A |
| 5,619,558 | A | | 4/1997 | Jheeta ......................... 379/90 |
| 5,794,210 | A | | 8/1998 | Goldhaber et al. ............. 705/14 |
| 5,823,879 | A | | 10/1998 | Goldberg et al. .............. 463/42 |
| 5,893,075 | A | | 4/1999 | Plainfield et al. ............... 705/14 |
| 5,933,811 | A | | 8/1999 | Angles et al. ................. 705/14 |
| 5,941,772 | A | * | 8/1999 | Paige .......................... 463/20 |
| 5,970,467 | A | | 10/1999 | Alavi .......................... 705/10 |
| 5,971,271 | A | | 10/1999 | Wynn et al. ................. 235/380 |
| 5,971,850 | A | | 10/1999 | Liverance .................... 463/23 |
| 5,974,398 | A | | 10/1999 | Hanson et al. ................ 705/14 |
| 6,003,013 | A | | 12/1999 | Boushy et al. ................ 705/10 |
| 6,036,601 | A | | 3/2000 | Heckel ......................... 463/42 |
| 6,270,412 | B1 | * | 8/2001 | Crawford et al. .............. 463/20 |
| 6,456,981 | B1 | | 9/2002 | Dejaeger et al. ............... 705/14 |
| 6,565,434 | B1 | * | 5/2003 | Acres .......................... 463/25 |
| 6,615,183 | B1 | * | 9/2003 | Kolls ........................... 705/26 |
| 6,656,040 | B1 | * | 12/2003 | Brosnan et al. ............... 463/16 |
| 7,225,143 | B1 | | 5/2007 | Kepecs ........................ 705/14 |

FOREIGN PATENT DOCUMENTS

WO      WO99/45508      9/1999

OTHER PUBLICATIONS

"The Rightpoint Real Time eMarketing Suite Wins Crossroads 2000 A-List Award; Rightpoint Real-Time eMarketing Suite Delivers Personalized, 1:1 eMarketing Solutions to the Global 2000" Sep. 8, 1999; Financial News; PR Newswire.

"Payment Information" download date; Sep. 14, 1999; HTMail; http://www.htmail.com.

"More Cash Prize!!!" Sep. 17, 1999; slotmachine@searchout.com.

"Webloyalty.com Our Company" download date; Mar. 27, 2000; http:www.webloyalty.com.

Legato, Frank "Tracking Success; Gaming Technology Review" download date; Mar. 29, 2000; http://www.casinocenter.com.

"Cyberleague Services"downlaod date; Apr. 8, 2000; Clickin: Cyberleague Services; http://www.clickin.com.

"Sodak-Vision Series and iGames" downlaod date; Apr. 9, 2000; Sodak Gaming Inc.; http://www.sodak-gaming.com.

"Making Money with AllAdvantage" download date; Apr. 9, 2000; The TechZone.com; http://www.thetechzone.com.

"Gcybergold" download date; Apr. 9, 2000; http://www.cybergold.com.

"Welcome to Cash for Surveys" download date; Apr. 9, 2000; http://www.cashforsurveys.com.

"C.ustomer Survey System" undated; Call Processing Inc.

Scott, Jonathan, "Abernathy firm devises user-friendly survey system", Business Dateline, Memphis Business Journal, Nov. 20, 1995, vol. 17, No. 29, Section 1 at p. 27.

Davis, L.J., "The Billionaire Shell Game", Published by Doubleday, a division of Bantam Doubleday Dell Publishing Group, Inc., Copyright 1998 at p. 214.

Turesik, Richard "Recycling Slot Machine is Tested at A&P Unit" Dec. 21, 1992; vol. 42; No. 51; p. 17; ISSN: 0039-5803; Supermarket News.

"New Software Brings Power and Capability to Web Research" Nov., 1997; Quantime; http://www.quantime.co.uk/corporate/press/QCweb.htm.

* cited by examiner

| QUESTION IDENTIFIER 602 | QUESTION 604 | POSSIBLE ANSWERS 606 | COMPENSATION TO PLAYER 608 | COST TO MARKETER 610 | MARKETER IDENTIFIER 612 |
|---|---|---|---|---|---|
| 12561Q | DO YOU OWN A MERCEDES? | YES, NO | $1.00 | $1.50 | GENERIC |
| 42564Q | DO YOU LIKE MOON ROOFS? | OPEN ENDED | $3.00 | $4.75 | 135M |

| PLAYER IDENTIFIER 702 | NAME 704 | FINANCIAL ACCOUNT IDENTIFIER 706 | DEMOGRAPHIC 708 | MACHINE IDENTIFIER 710 | SESSION THEORETICAL WIN 712 | HISTORICAL THEORETICAL WIN 714 | CURRENTLY PLAYING? 716 | EARNINGS 718 |
|---|---|---|---|---|---|---|---|---|
| 111123P | SAM BROWN | 1111-1111-1111-1111 | MALE, AGE 23 | 234M | $58 | $252 | YES | $26 |
| 222234P | LINDA JONES | 2222-2222-2222-2222 | FEMALE, AGE 47 | 532M | $63 | $357 | NO | --- |

302B

720 → (row 1)
722 → (row 2)

FIG. 7

| QUESTION IDENTIFIER 602 | PLAYER IDENTIFIER 702 | ANSWER 802 | DATE AND TIME OF ANSWER 804 |
|---|---|---|---|
| 23514Q | 395322P | YES | 1/23/2003 2:34 PM |
| 49322Q | 032945P | I PREFER RED CARS | 2/12/2003 4:00 AM |

302C

820 → (first data row)
822 → (second data row)

FIG. 8

| MARKETER IDENTIFIER 612 | FINANCIAL ACCOUNT IDENTIFIER 706 | QUESTIONS PAID FOR 902 | POOL DEFINITION 904 | TIME BY WHICH RESULTS ARE NEEDED 906 |
|---|---|---|---|---|
| 251M | 3333-3333-3333-3333 | 15 | 500 PEOPLE, AGED 21-35 | 1/13/2003 |
| 693M | 4444-4444-4444-4444 | 10 | 200 PEOPLE, FEMALE, AGED 35-45 | 1/18/2003 12 PM |

| PLAYER NAME 704 | ADDRESS 1002 | PRODUCT NAME 1004 | BUY /SAMPLE 1006 | FINANCIAL ACCOUNT IDENTIFIER 706 | DEADLINE TO RETURN PRODUCT 1008 | PAID? 1010 |
|---|---|---|---|---|---|---|
| SAM GREEN | ANYPLACE, USA | PERSONAL DIGITAL ASSISTANT | SAMPLE | 3333-3333-3333-3333 | 3/12/2003 | NO |
| HILDA SNOW | SOMEPLACE, USA | SWISS WATCH | BUY | 4444-4444-4444-4444 | N/A | YES |

| PRODUCT NAME 1004 | QUANTITY IN STOCK 1102 | PRICE 1104 |
|---|---|---|
| PERSONAL DIGITAL ASSISTANT | 10 | $510 |
| SWISS WATCH | 20 | $2500 |

502B

1120 → (PERSONAL DIGITAL ASSISTANT)
1122 → (SWISS WATCH)

FIG. 11

METHOD AND APPARATUS FOR COMPENSATING PARTICIPATION IN MARKETING RESEARCH

RELATED APPLICATIONS

This application claims the benefit of U.S. Provisional Application Ser. No. 60/201,134, filed May 2, 2000 in the name of WALKER et al. and entitled, SPONSORED SLOTS.

The content of the provisional application is incorporated herein by reference.

This application is related to:

(i) U.S. patent application Ser. No. 08/769,085, filed Dec. 18, 1996 in the name of WALKER et al. and entitled, SLOT MACHINE ADVERTISING/SALES SYSTEM AND METHOD, which issued as U.S. Pat. No. 6,186,893 on Feb. 13, 2001;

(ii) U.S. patent application Ser. No. 08/820,499, filed Mar. 19,1997 in the name of WALKER et al. and entitled, SYSTEM AND METHOD FOR TELEMARKETING PRESENTATIONS, which issued as U.S. Patent No. 6,216,111 on Apr. 10, 2001

(iii) U.S. patent application Ser. No. 08/885,157, filed Jun. 30, 1997 in the name of WALKER et al. and entitled, ELECTRONIC GAMING DEVICE OFFERING A GAME OF KNOWLEDGE FOR ENHANCED PAYOUTS, which issued as U.S. Pat. No. 6,193,606 on Feb. 27, 2001;

(iv) U.S. patent application Ser. No. 09/110,626, filed Jul. 6, 1998 in the name of WALKER et al. and entitled, METHOD AND APPARATUS FOR ADMINISTERING A SURVEY, which issued as U.S. Pat. No.6,093,026 on Jul. 25, 2000;

(v) U.S. patent application Ser. No. 09/152,905, filed Sep. 14, 1998 in the name of TEDESCO et al. and entitled, VENDING MACHINE METHOD AND APPARATUS FOR ENCOURAGING PARTICIPATION IN A MARKETING EFFORT, which issued as U.S. Pat. No. 6,161,059 on Dec. 12, 2000;

(vi) U.S. patent application Ser. No. 09/205,663, filed Dec. 4, 1998 in the name of WALKER et al. and entitled, METHOD AND SYSTEM FOR UTILIZING A PSYCHOGRAPHIC QUESTIONNAIRE IN A BUYER-DRIVEN COMMERCE SYSTEM, which issued as U.S. Pat. No. 6,332,129 on Dec. 18, 2001;

(vii) U.S. patent application Ser. No. 09/282,128, filed Mar. 31, 1999 in the name of WALKER wet al. and entitled METHOD AND APPARATUS FOR ADMINISTERING A SURVEY VIA A TELEVISION TRANSMISSION NETWORK, which issued as U.S. Pat. No. 6,513,014 on Jan. 28, 2003;

(viii) U.S. patent application Ser. No. 09/316,546, filed May 21, 1999 in the name of WALKER et al. and entitled, METHOD AND APPARATUS FOR PROCESSING CREDIT CARD TRANSACTIONS;

(ix) U.S. patent application Ser. No. 09/528,043, filed Mar. 17, 2000 in the name of WALKER et al. and entitled, SYSTEM AND METHODS FOR COMMUNICATING INFORMATION TO A CUSTOMER, now abandoned;

(x) U.S. patent application Ser. No. 09/537,253, filed Mar. 29, 2000 in the name of WALKER et al. and entitled, METHOD AND APPARATUS FOR PROVIDING ANONYMOUS SERVICE PROVIDER ACCESS, now abandoned;

(xi) U.S. patent application Ser. No. 09/540,498, filed Mar. 31, 2000 in the name of WALKER et al. and entitled METHOD AND APPARATUS FOR ADMINISTERING A SURVEY VIA A NETWORK, now abandoned; and (xii) U.S. patent application Ser. No. 09/605,732, filed Jun. 28, 2000 in the name of WALKER et al. and entitled, SYSTEMS AND METHODS TO COMPENSATE A CUSTOMER IN EXCHANGE FOR PROVIDING COMMENT INFORMATION ASSOCIATED WITH A MERCHANT, now abandoned.

BACKGROUND OF THE INVENTION

1. Field of the Invention

The present invention relates generally to marketing programs, and more particularly to marketing programs for use in the gaming industry.

2. Background

Many businesses devote substantial portions of their marketing budgets to promotions aimed at gaining the attention of prospective customers. Much of this promotional spending is dedicated to advertising through various media such as television, radio, print, direct mail, e-mail, instant messaging and banner ads. Unfortunately however, prospective customers typically have little incentive to pay attention to such advertising. Low perceived benefits of reviewing advertising, combined with tools easing avoidance of advertising, have made it challenging to reach prospective customers. For example, a remote control can be used to change channels to avoid television commercials. Also, click-through rates of online banner advertising have proven to be much lower than had once been hoped. Because of these insufficient incentives, conventional advertising is largely disregarded by audiences.

In an effort to more accurately target advertising, marketers will frequently use surveys to understand the needs and desires of their customers and potential customers. However, conventional survey techniques suffer from numerous inefficiencies. Once a marketer defines a pool of survey participants, it can be very time consuming and costly to assemble the desired participants. Further, conventional survey methods do not compensate participants sufficiently so as to insure meaningful and reliable responses. It is also difficult using conventional survey techniques to provide compensation when it is most meaningful to participants and therefore, the most encouraging of sincere participation.

Conventional survey techniques are also often ineffective. Marketers do not have adequate information about the survey participants and therefore cannot make demographic-specific conclusions based on the results of the surveys. Further, in conventional techniques, marketers do not maintain an ongoing relationship with survey participants. Therefore, marketers cannot administer effective follow-up surveys based on the results of a first survey. Methods are needed for conducting surveys wherein age, demographic, financial, and other information about the survey participants is well known. Furthermore, methods are needed for administering surveys to survey participants with whom a marketer can establish an on-going relationship for the administration of follow-up surveys.

SUMMARY OF THE INVENTION

The present invention includes a method, system, and computer program product for overcoming the above and other shortcomings of conventional solutions. The present invention provides a system which enables customers to receive immediate, tangible compensation in exchange for responses such as paying attention to marketing messages, providing product or service feedback, committing to purchase a product, or purchasing a product.

An exemplary embodiment of a marketing method of the present invention features a technique whereby a marketer can transmit marketing questions to a slot server that can be coupled to one or more slot machines. The marketer can specify a target survey pool for a marketing program. The slot server can transmit the marketing questions to players at the slot machines. The pool of players can be limited to those who are included in the marketer's target pool. The players can read the survey questions via display devices and can provide answers via input devices, where the display and input devices can be associated with the slot machines. The slot machines can transmit the inputted answers to the slot server, and can dispense compensation to the players for answering the survey questions. The slot server can transmit to the marketer the answers to the survey questions and multiple players' answers can be aggregated prior to transmission to the marketer. The marketer can also compensate the owner of the slot server.

Advantageously, the present invention uses the ability of a slot machine to dispense money to compensate players of the slot machine for performing services such as viewing ads, responding to surveys, purchasing products and agreeing to sample or test new products.

Advantageously, the present invention uses the ability of a slot machine to present surveys, advertisements and purchase offers. The ability, coupled with a slot machine's ability to dispense money, allows a player to receive immediate monetary compensation in return for services performed. Such immediate and tangible monetary compensation is more motivating to a player than, for example, the promise of receiving a check in the mail. Such compensation is even more highly motivating if it serves to offset gambling losses or gambling debt.

Advantageously, casinos benefit from the players' propensity to immediately invest the compensation received from the marketer into the slot machine.

Another advantage of the present invention includes improved targeting of surveys provided by immediate availability of player information. For example, such information can include the fact that the player is at least twenty-one years old, and that the player is at the location of the slot machine. Results of the gambling session can be further made available from the slot machine. Other information can also be made available from the database records associated with the tracking card of the player.

One embodiment of the invention features a method for gathering marketing or other information from a player including transmitting a question to a player proximate in space to a compensation dispensing machine, receiving a response to the question from the player, and transmitting a signal to the compensation dispensing machine providing compensation to the player.

The method can further receive player information which can include receiving a gambling history of the player or a player identifier, using the player identifier to access player information from a database, identifying a marketing question appropriate for the player, determining an appropriate time to ask the marketing question, or transmitting the marketing question to the player at the appropriate time, such as a time when there is no interruption or a time when the player is losing.

The method can also further include receiving a marketing question and a marketing pool definition, where the marketing pool definition can be used in prioritizing multiple players, choosing a highest priority player of the multiple players, identifying a player not already slated to participate in a different marketing program of the multiple players, identifying a player of the multiple players having a losing gambling history and satisfying the marketing pool definition, receiving a marketing question identifier, or using the marketing question identifier to access a marketing question from a database. The marketing question and the marketing pool definition can be received from a marketer. The method can also include identifying a player corresponding to the marketing pool definition.

The method can further include formulating an offer to the player and can include presenting the offer to the player. The offer can be for compensation.

Compensation can include offsetting a gambling loss, an erasure of a debt, an erasure of a gambling loss, a waiver of an otherwise due required purchase or payment, cash, credit, a gambling token, an increase in odds of winning, an increased prize payout, an insurance protection against a loss, an ability to play a higher denomination currency gaming machine for a lower denomination currency, a free use of an extra coin in a multi-coin slot machine, an ability to play for free, an ability to have winnings rounded up to a higher amount, participation in a skill or chance game or contest (i.e. a progressive jackpot) that is only available to survey participants, or an auxiliary benefit such as a free meal, a subsidized meal, a free room, or a subsidized room.

The method can also further include transmitting the compensation in a time period proximate to receipt of the response from the player.

The compensation dispensing ma chine may be one of several devices including: a slot machine, a gaming machine, a point-of-sale (POS) terminal, a vending machine, a digital audio or video dispensing machine, a kiosk, a ticket dispenser, a stamp dispenser or an automated teller machine (ATM). Alternatively, the compensation dispensing machine may prompt an attendant to provide compensation.

The method can further include formatting marketing program results based on the responses, and can include transmitting the marketing program results to a marketer.

Transmission of compensation can include transmitting tangible compensation to the player, transmitting compensation to the player upon receiving the response, transmitting to the player via an automated device, or transmitting proximate in time to receiving the response.

The marketing question can include a survey, an advertisement, a promotion, a focus group question, or an offer to accept a commitment.

The method can include receiving the response where the response includes feedback, a commitment, and an acceptance of an offer to accept a commitment.

In another embodiment, a method for gathering marketing information from a player includes transmitting a marketing question to a player, receiving a response to the marketing question from the player, and transmitting a signal causing a compensation dispensing machine to provide compensation to the player at a time proximate to receipt of the response. The compensation dispensing machine can be proximate in space to the player.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings. In the drawings, like reference numbers generally indicate identical, functionally similar, and/or structurally similar elements. The drawing in which an element first appears is generally indicated by the left-most digits in the corresponding reference number.

FIG. 6 depicts a two-dimensional chart illustrating an exemplary slot server questions database according to the present invention;

FIG. 7 depicts a two-dimensional chart illustrating an exemplary slot server player database according to the present invention;

FIG. 8 depicts a two-dimensional chart illustrating an exemplary slot server answers database according to the present invention;

FIG. 9 depicts a two-dimensional chart illustrating an exemplary slot server marketer database according to the present invention;

FIG. 10 depicts a two-dimensional chart illustrating an exemplary product fulfillment branch player database according to the present invention;

FIG. 11 depicts a two-dimensional chart illustrating an exemplary product fulfillment branch product database according to the present invention.

DETAILED DESCRIPTION OF AN EXEMPLARY EMBODIMENT OF THE INVENTION

A preferred embodiment of the invention is discussed in detail below. While specific implementations are discussed, it should be understood that this is done for illustration purposes only. A person skilled in the relevant art will recognize that other components and configurations can be used without departing from the spirit and scope of the invention.

Figure 1:
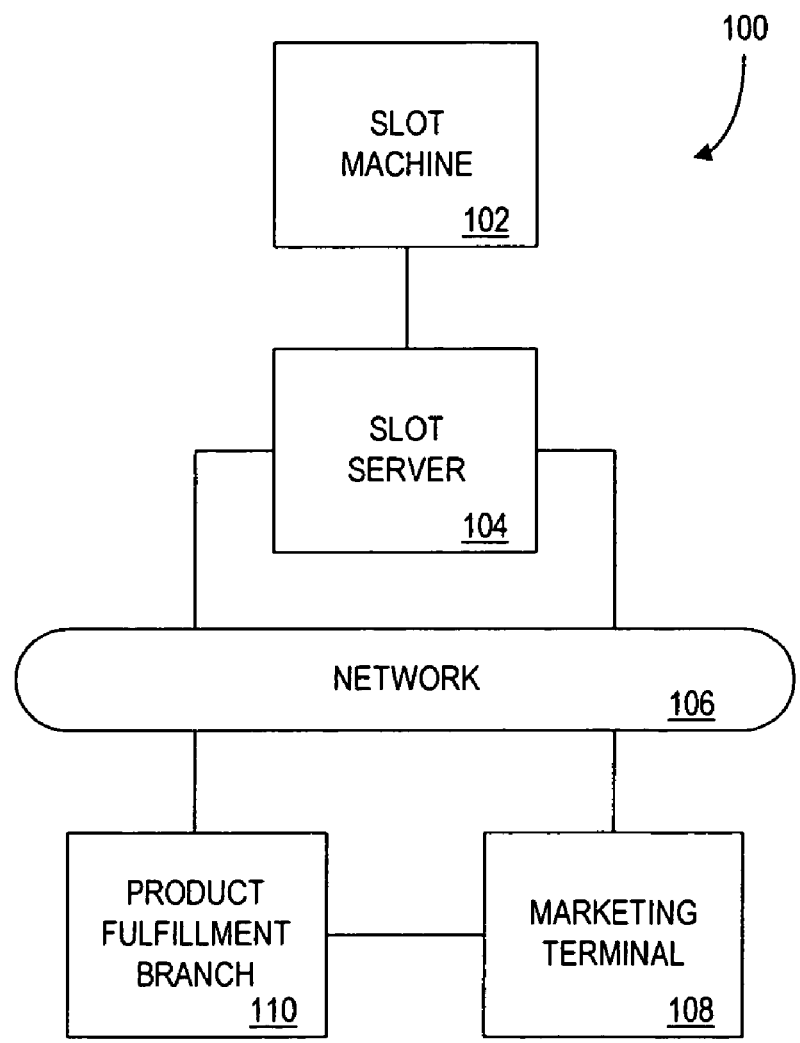
FIG. 1 depicts a high-level block diagram illustrating an exemplary embodiment of a system overview including a slot machine, a slot server, a marketing terminal, a network, and a product fulfillment branch according to the present invention.

FIG. 1 depicts a high-level block diagram 100 illustrating an exemplary embodiment of a system overview of the present invention. The exemplary embodiment of block diagram 100 can include a slot machine 102 that can be coupled to a slot server 104. Slot server 104 can be coupled via a network 106 to a marketing terminal 108 and a product fulfillment branch 110. As shown, in one exemplary embodiment, slot server 104 can be coupled by multiple, redundant connections to network 106, for increased reliability and availability. It will be apparent to those skilled in the art that network 106 can include any of various components well known within the relevant art to provide communications access between nodes of network 106, such as the Internet or wireless networks. It will also be apparent to those skilled in the art that alternative configurations can be used to couple the devices of the present invention.

A slot machine player (or customer) (not shown) can interact with a slot machine 102. Any portion of diagram 100 can be located at the gaming location such as a casino or cruise ship (not shown). A casino can be an owner of slot machines 102, and can be the entity which can profit from customers' use of the slot machines 102.

Slot machine 102, in an exemplary embodiment, is any compensation dispensing machine or device, i.e., a machine capable of dispensing compensation. Slot machine 102 will be described in greater detail below with reference to FIG. 2.

Slot server 104 can also be referred to as a controller. In an exemplary embodiment, slot server 104 is a device that is capable of receiving survey questions from one or more marketing terminals 108. The slot server can transmit the questions to at least one slot machine 102. Slot server 104 can receive responses from the slot machine 102 or other compensation dispensing machine, and can transmit the responses to the marketing terminal 108. In an exemplary embodiment, the responses can be sent at a time proximate to the receiving of responses. Slot server 104 will be described in greater detail below with reference to FIG. 3.

Marketing terminal 108, in an exemplary embodiment, is a device that can receive instructions from a marketer (not shown) and can communicate instructions to the slot server 104 via network 106. The marketer can be an entity which wants interaction with current or potential customers. The interaction can involve, e.g., the marketer receiving customer opinions, receiving commitments from a customer, and advertising products to the customer. Marketing terminal 108 will be described in greater detail below with reference to FIG. 4.

Product fulfillment branch 110 will be described in greater detail below with reference to FIG. 5.

Figure 2:
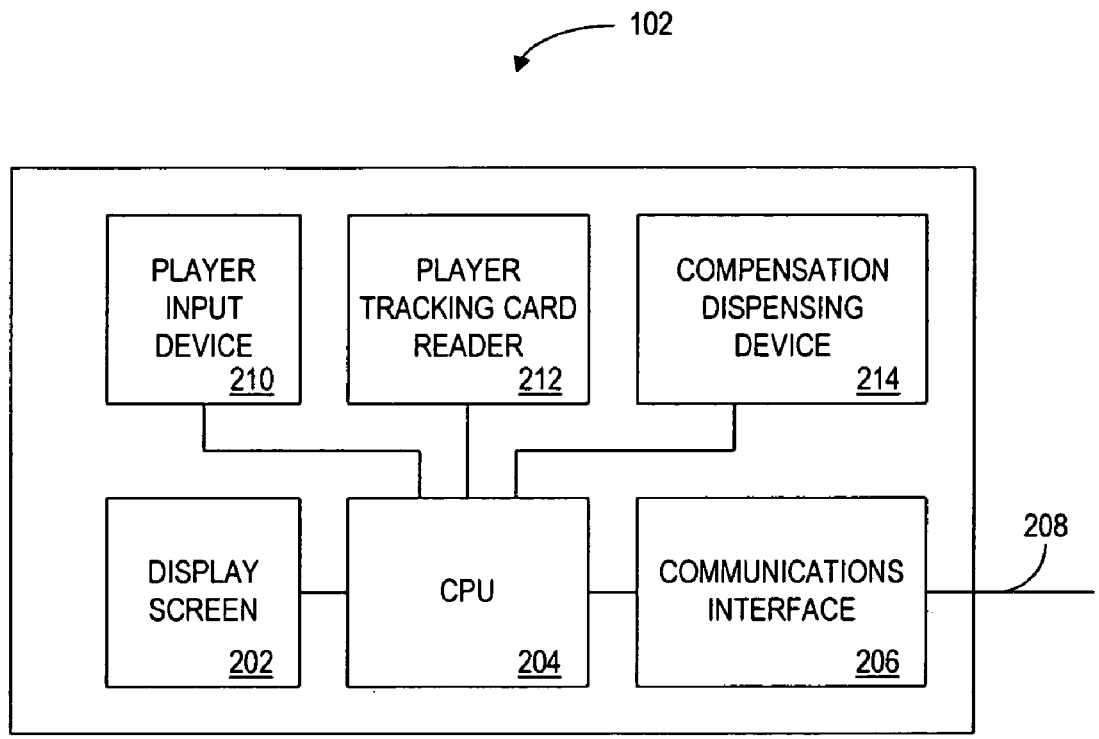
FIG. 2 depicts a block diagram illustrating an exemplary slot machine in greater detail according to the present invention.

FIG. 2 depicts a more detailed block diagram illustrating an exemplary embodiment of a compensation dispensing machine, i.e., slot machine 102. Slot machine 102 includes, in an exemplary embodiment, a central processing unit (CPU) 204 that can be coupled to, e.g., a display screen 202, a communications interface 206, a player input device 210, a player tracking card reader 212, and a compensation dispensing device 214. Communications interface 206 can be coupled to a link 208 that couples slot machine 102 to slot server 104 as shown in FIG. 1, above. The player input device 210 may include a microphone, keyboard, or other well known input apparatus to receive voice or other types of commands.

Other compensation dispensing machines can also include compensation dispensing device 214. Exemplary embodiments of compensation dispensing machines can include, e.g., a slot machine, a gaming machine, a point-of-sale (POS) terminal, a vending machine, a digital audio, music or video dispensing machine, a kiosk, a ticket dispenser, a stamp dispenser or an automated teller machine (ATM). It will be apparent to those skilled in the art that the present invention is equally applicable to other compensation dispensing machines.

Slot machine 102 can include a payline (not shown). The payline can be a dimension on the slot machine 102 along which particular symbols can line up in order for a slot machine player to receive a prize. A typical slot machine 102 may have a single payline running left to right across the center of a display screen 202. Additional paylines can run left to right across the top of the screen, or can run up and down, diagonally, or along some irregular path. A prize table (not shown) can include a chart that lists winning symbol combinations together with the size of the prizes paid when the listed symbols are obtained.

Figure 3:
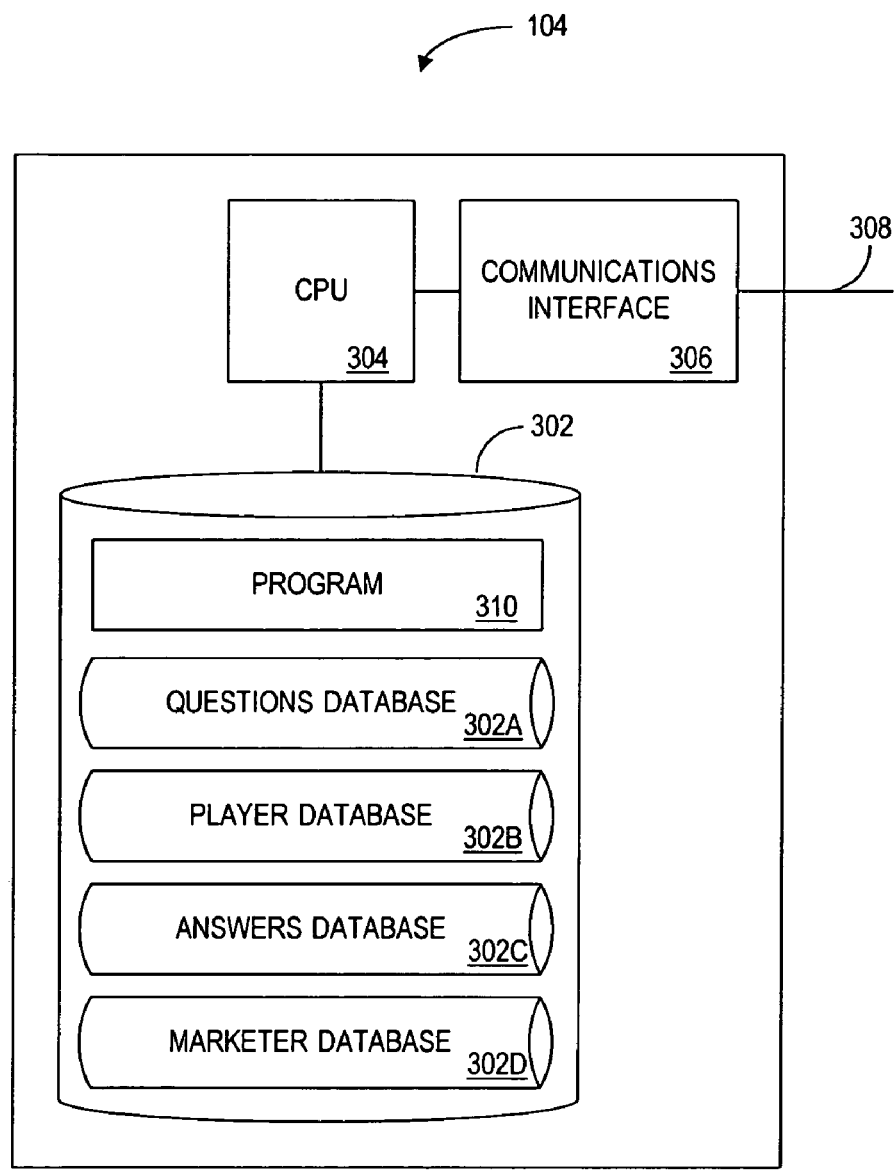
FIG. 3 depicts a block diagram illustrating an exemplary slot server in greater detail according to the present invention.

FIG. 3 depicts a more detailed block diagram illustrating an exemplary embodiment of the slot server 104 that can include a CPU 304 coupled to a communications interface 306 and a slot server data storage device 302. Communications interface 306 can be coupled to a link 308 that couples slot server 104 to slot machine 102 and network 106 as shown in FIG. 1, above. An exemplary embodiment of a slot server data storage device 302 is shown including exemplary databases including, e.g., a questions database 302*a*, a player database 302*b*, an answers database 302*c*, and a marketer database 302*d*. Databases 302*a*–302*d* will be described in greater detail below with reference to FIGS. 6–9, respectively, including detailed diagrams of exemplary records and exemplary fields within records of exemplary databases 302*a*–302*d*. It will be apparent to those skilled in the art that other and/or alternative databases could be included within the scope of the present invention. Program 304 is operative to perform the methods of the invention which may include accessing the databases described above.

Figure 4:
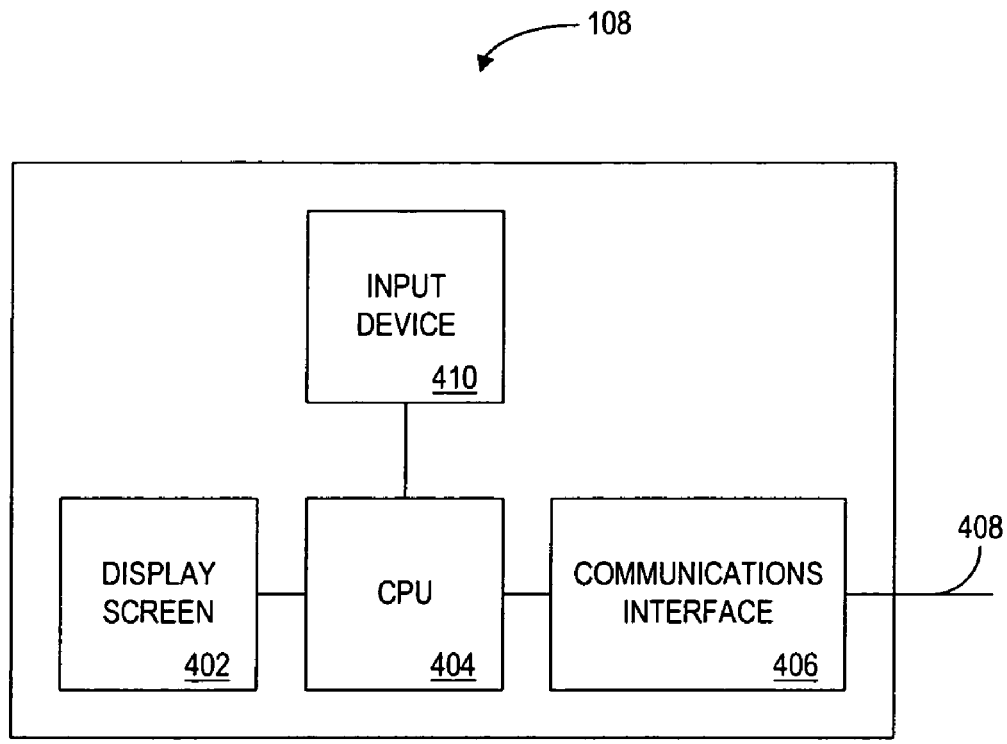
FIG. 4 depicts a block diagram illustrating an exemplary marketing terminal in greater detail according to the present invention.

FIG. 4 depicts a more detailed block diagram illustrating an exemplary embodiment of marketing terminal 108 including a central processing unit (CPU) 404 coupled to a display screen 402, a communications interface 406, and an input device 410. Communications interface 406 can be coupled to a link 408 that couples marketing terminal 108 to network 106 or product fulfillment branch 110 as shown in FIG. 1, above.

Figure 5:
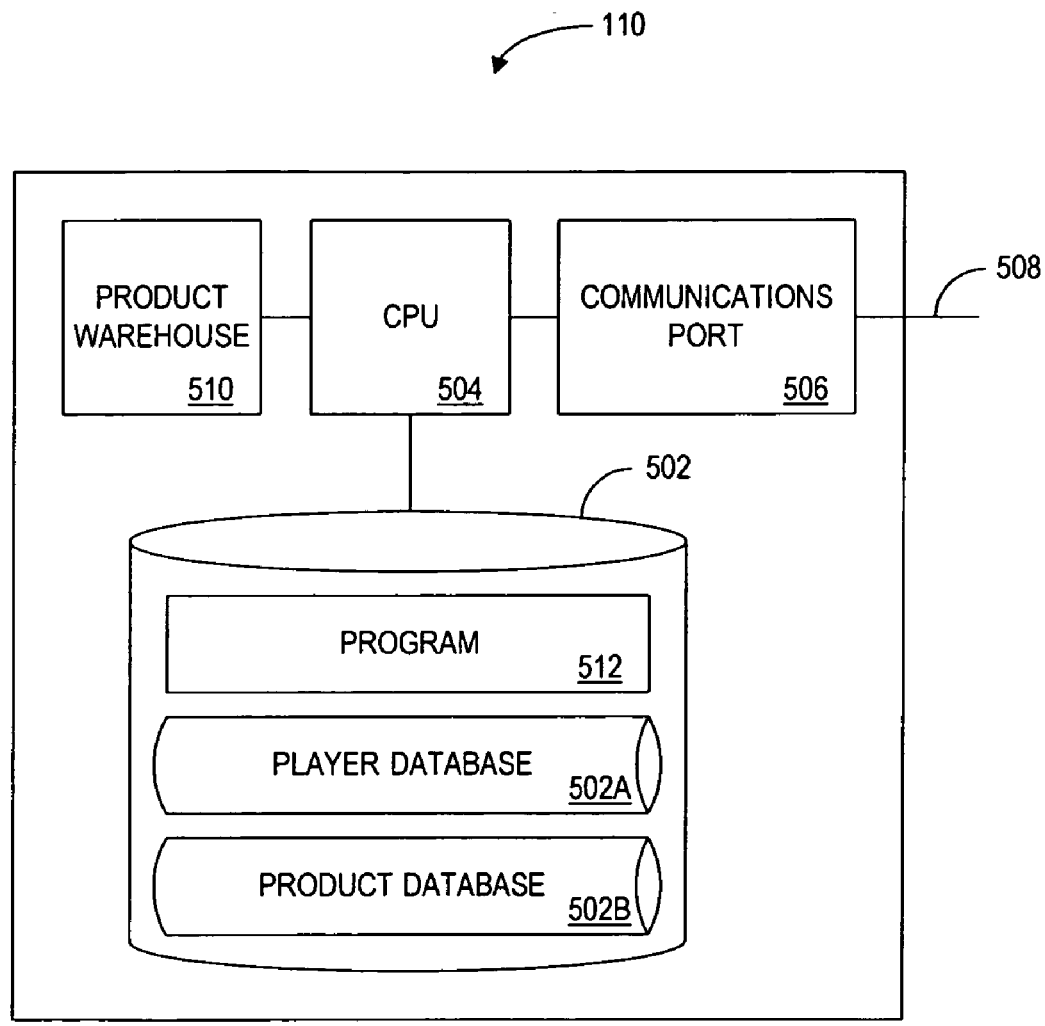
FIG. 5 depicts a block diagram illustrating an exemplary product fulfillment branch in greater detail according to the present invention.

FIG. 5 depicts a more detailed block diagram illustrating an exemplary embodiment of the product fulfillment branch 110 that includes a CPU 504 coupled to a communications interface 506, a product fulfillment branch data storage device 502, and a product warehouse 510. Communications interface 506 can be coupled to a link 508 that couples product fulfillment branch 110 to network 106 or marketing terminal 108 as shown in FIG. 1, above. An exemplary embodiment of a product fulfillment branch data storage device 502 is shown including exemplary databases such as a player database 502*a* and a product database 502*b*. Databases 502*a* and 502*b* will be described in greater detail below with reference to FIGS. 10 and 11, respectively, including detailed diagrams of exemplary records and exemplary fields within records of exemplary databases 502*a* and 502*b*. It will be apparent to those skilled in the art that other and/or alternative databases could be included within the scope of the present invention. Program 504 is operative to perform the methods of the invention which may include accessing the databases described above.

FIG. 6 depicts a two-dimensional chart illustrating an exemplary questions database 302*a* of slot server 104 according to the present invention. This database is used as a source of the survey questions asked of the players. The contents of question database 302A maybe frequently updated, with questions deleted and added as appropriate.

Illustratively, questions database 302*a* is depicted in FIG. 6 having two question records 620 and 622 representing a question with possible answers and potential compensation. Each of the question records 620, 622 includes six (6) exemplary fields labeled question identifier 602, question 604, possible answers 606, compensation to the player 608, cost to the marketer 610 and market identifier 612, respectively.

The first exemplary field of questions database 302*a* contains a question identifier 602. The question identifiers 602 for questions records 620 and 622, are 12561Q and 42564Q, respectively.

The second exemplary field of questions database 302*a* contains a question 604. The question 605 for questions records 620 and 622, are "Do you own a Mercedes?" and "Do you like moon roofs?," respectively. Such questions could include accompanying graphics such as a corporate logo or trademark.

The third exemplary field of questions database 302*a* includes possible answers field 606. The possible answers 606 for questions records 620 and 622, are "Yes, No" and "Open Ended", respectively. The possible answers field indicates an answer format.

The fourth exemplary field of questions database 302*a* contains a compensation to player 608. The compensation to player 608 for questions records 620 and 622, are "$1.00" and "$3.00", respectively. These amounts may be updated by slot server 104 in order to manage player demand for questions as described in more detail relative to FIG. 12.

The fifth exemplary field of questions database 302*a* contains a cost to marketer 610. The cost to market 610 for questions records 620 and 622, are "$1.50" and "$4.75", respectively.

The sixth exemplary field of questions database 302*a* contains a marketer identifier 612. The marketer identifier 612 for questions records 620 and 622, are "generic" and "135M", respectively.

It will be apparent to those skilled in the art that additional or alternative fields and records can be included in the database without departing from the spirit and scope of the present invention.

FIG. 7 depicts a two-dimensional chart illustrating an exemplary player database 302*b* of slot server 104 according to the present invention. This database may store player information such as historical gaming results, demographic information, contact information, and the like. The database may also be used to track the results of surveys completed by the player and their associated earnings.

Illustratively, player database 302*b* is depicted in FIG. 7 having two player records 720 and 722, corresponding to each player. Each of the player records 720, 722 includes nine (9) fields labeled player identifier 702, name 704, financial account identifier 706, demographic 708, machine identifier 710, session theoretical win 712, historical theoretical win 714, currently playing field 716 and earnings 718, respectively.

The first exemplary field of player database 302*b* contains a player identifier 702. The player identifier 702 for each of the player records 720, 722 is "111123P" and "222234P", respectively.

The second exemplary field of player database 302*b* contains a name 704. The name 704 for each of the player records 720, 722 is "Sam Brown," and "Linda Jones," respectively.

The third exemplary field of player database 302*b* contains a financial account identifier 706. The financial account identifier 706 for each of the player records 720, 722 is "1111-1111-1111-1111" and "2222-2222-2222-2222", respectively. The financial account could be a credit card number, a debit card number, a checking account number, a prepaid phone account number, or the like.

The fourth exemplary field of player database 302*b* contains a demographic 708. The demographic 708 for each of the player records 720, 722 is "male, age 23" and "female, age 47", respectively. Such a field could contain other demographic information including religion, income, number of children, height, weight, other physical characteristics, medical conditions, shopping habits, psychographics, diet, ethnicity, clothing size, educational level, marital status, and geographic mobility.

The fifth exemplary field of player database 302*b* contains a machine identifier 710: The machine identifier 710 for each of the player records 720, 722 is "234M" and "532M", respectively. This could identify a machine within a particular casino, within a group of casinos, within a network of affiliated casinos, or among all slot machines.

The sixth exemplary field of player database 302b contains a session theoretical win 712. The session theoretical win 712 for each of the player records 720, 722 is "$58" and "$63", respectively. The session theoretical win is an example of data that may be used to identify players for a survey. Also, it can be tracked on a monthly or annual basis. Alternatively or additionally, this field may store actual player win/loss, coin-in, drop, or the like.

The seventh exemplary field of player database 302b contains a historical theoretical win 714. The historical theoretical win 714 for each of the player records 720, 722 is "$252" and "$357", respectively. This theoretical win might represent the lifetime value of the player and may also be used to select a player for a survey.

The eighth exemplary field of player database 302b contains a whether currently playing field 716 identifying whether the player represented by the player record is currently playing. The whether currently playing field 716 for each of the player records 720, 722 is "yes" and "no", respectively. It should be understood that the term player as used herein includes players who have played in the past.

The ninth exemplary field of player database 302b contains an earnings field 718. The earnings 718 for each of the player records 720, 722 is "$26" and " - - - ", respectively. The earnings field 718 stores a representation of the amount of earnings of the player in the current session of play. Note that this amount may be positive, negative, or zero. The earnings may be an indicator of a player's bias in a survey. This bias may be taken into account when determining the significance to assign to a player's answer to a survey question. For example, if a player has large negative earnings he may respond negatively to many types of questions purely out of disappointed feelings resulting from his loss. Either the marketer or slot server may decide to discount or ignore potentially biased responses from a player with large negative earnings.

It will be apparent to those skilled in the art that additional or alternative fields and records can be included in the database without departing from the spirit and scope of the present invention.

FIG. 8 depicts a two-dimensional chart illustrating an exemplary answers database 302c of the slot server 104 according to the present invention.

Illustratively, answers database 302c is depicted in FIG. 8 having two answer records 820 and 822. Each of the answer records 820, 822 includes four (4) fields labeled question identifier 602, player identifier 702, answer 802, and date and time of answer 804, respectively.

The first exemplary field of answers database 302c contains a question identifier 602, identifying the question associated with the answer in each answer record 820, 822. The question identifier for each of the answer records 820, 822 is "23514Q" and "49322Q", respectively.

The second exemplary field of answers database 302c contains player identifier 702. The player identifier 702 for each of the answer records 820, 822 is "395322P" and "032945P", respectively. Such an identifier may be associated with the player tracking card of the player.

The third exemplary field of answers database 302c contains an answer 802. The answer 802 for each of the answer records 820, 822 is "Yes," and "I prefer red cars," respectively. In addition to storing text-based answers, this field could store answers in the form of sound files (e.g., .WAV, or MP3 files), or as graphics files operable to store such input as handwriting or video data.

The fourth exemplary field of answers database 302c contains a date and time of answer 804. The date and time of the answer 804 for each of the answer records 820, 822 is "1/23/2003 2:34 PM," and "2/12/2003 4:00 AM," respectively.

It will be apparent to those skilled in the art that additional or alternative fields and records can be included in the database without departing from the spirit and scope of the present invention.

FIG. 9 depicts a two-dimensional chart illustrating an exemplary marketer database 302d of the slot server 104 according to the present invention.

Illustratively, marketer database 302d is depicted in FIG. 9 having two marketer records 920 and 922. Each of the marketer records 920, 922 includes five (5) fields labeled marketer identifier 612, financial account identifier 706, questions paid for 902, pool definition 904 and time by which results are needed 906, respectively.

The first exemplary field of marketer database 302d contains marketer identifier 612, identifying the marketers represented by each marketer record. The marketer identifier 612 for each of the marketer records 920, 922 is "251 M", "693M", respectively.

The second exemplary field of marketer database 302d contains financial account identifier 706. The financial account identifier 706 for each of the marketer records 920, 922 is "3333-3333-3333-3333" and "4444-4444-4444-4444", respectively. Such account identifiers may include credit card numbers or checking account numbers with which funds may be drawn.

The third exemplary field of marketer database 302d contains questions paid for field 902 tracking the number of questions paid for by a given marketer. The questions paid for field 902 for each of the marketer records 920, 922 is "15" and "10", respectively.

The fourth exemplary field of marketer database 302d contains a pool definition 904. The pool definition 904 for each of the marketer records 920, 922 is "500 people, aged 21–35" and "200 people, female, aged 3545", respectively. Other types of pools may include e.g., former luxury automobile owners, current sport utility vehicle lessors, players that have won $100.00 in the last hour, players from Chicago, German-speaking players, etc. Group membership could also be determined by analysis of such other factors or information as responses to questions.

The fifth exemplary field of marketer database 302d contains a time by which results are needed 906. The time by which results are needed 906 for each of the marketer records 920, 922 is "Jan. 13, 2003" and "Jan. 18, 2003 12 PM", respectively.

It will be apparent to those skilled in the art that additional or alternative fields and records can be included in the database without departing from the spirit and scope of the present invention.

FIG. 10 depicts a two-dimensional chart illustrating an exemplary player database 502a for product fulfillment branch 110 according to the present invention.

Illustratively, player database 502a is depicted in FIG. 10 having two player records 1020 and 1022. Each of the player records 1020, 1022 includes seven (7) fields labeled name 704, address 1002, product name 1004, buy/sample 1006, financial account identifier 706, deadline to return product 1008, and whether paid 1010, respectively.

The first exemplary field of player database 502a contains a name 704. The name 704 for each of the player records 1020, 1022 is "Sam Green," and "Hilda Snow," respectively.

The second exemplary field of player database 502a contains an address 1002. The address 1002 for each of the player records 1020, 1022 is "Anyplace, USA," and "Someplace, USA," respectively.

The third exemplary field of player database 502a contains a product name 1004 requested. The product name 1004 for each of the player records 1020, 1022 is "Personal Digital Assistant" and "Swiss Watch," respectively.

The fourth exemplary field of player database 502a contains a buy/sample 1006. The buy/sample 1006 for each of the player records 1020, 1022 is "Sample" and "Buy", respectively. The buy/sample field 1006 stores a representation of a players acceptance of an offer to either buy or sample a product or service. Such an offer may be presented following a promotional presentation of the product at the slot machine.

The fifth exemplary field of player database 502a contains a financial account identifier 706. The financial account identifier 706 for each of the player records 1020, 1022 is "3333-3333-3333-3333" and "4444444-4444-4444", respectively.

The sixth exemplary field of player database 502a contains a deadline to return product 1008. The deadline to return product 1008 for each of the player records 1020, 1022 is "3/12/2003" and "N/A", respectively.

The seventh exemplary field of player database 502a contains a whether paid field 1010. The whether paid field 1010 for each of the player records 1020, 1022 is "No" and "Yes", respectively. This field may indicate whether the player has paid for the goods that he purchased, sampled, and/or reviewed.

It will be apparent to those skilled in the art that additional or alternative fields and records can be included in the database without departing from the spirit and scope of the present invention.

FIG. 11 depicts a two-dimensional chart illustrating an exemplary product database 502b for product fulfillment branch 110 according to the present invention. This database may be used to identify products and/or services available for players to purchase, sample and/or review.

Illustratively, product database 502b is depicted in FIG. 11 having two product records 1120 and 1122. Each of the product records 1120, 1122 includes three (3) fields labeled product name 1004, quantity in stock 1102, and price 1104, respectively.

The first exemplary field of product database 502b contains a product name 1004 including the name of the product represented by each record. The product name 1004 for each of the product records 1120, 1122 is "personal digital assistant," and "Swiss watch," respectively. Many products may be offered to players including personal services such as haircut, facials, manicures, pedicures, valet, chauffeur; products such as computers, clothing, electronics, wine, food; and entertainment such as music, movies, and the like.

The second exemplary field of product database 502b contains a quantity in stock 1102. The quantity in stock 1102 for each of records 1120, 1122 is "10," and "20," respectively.

The third exemplary field of product database 502b contains a price 1104. The price 1104 for each of records 1120, 1122 is "$510," and "$2500," respectively.

It will be apparent to those skilled in the art that additional or alternative fields and records can be included in the database without departing from the spirit and scope of the present invention.

Figure 12:
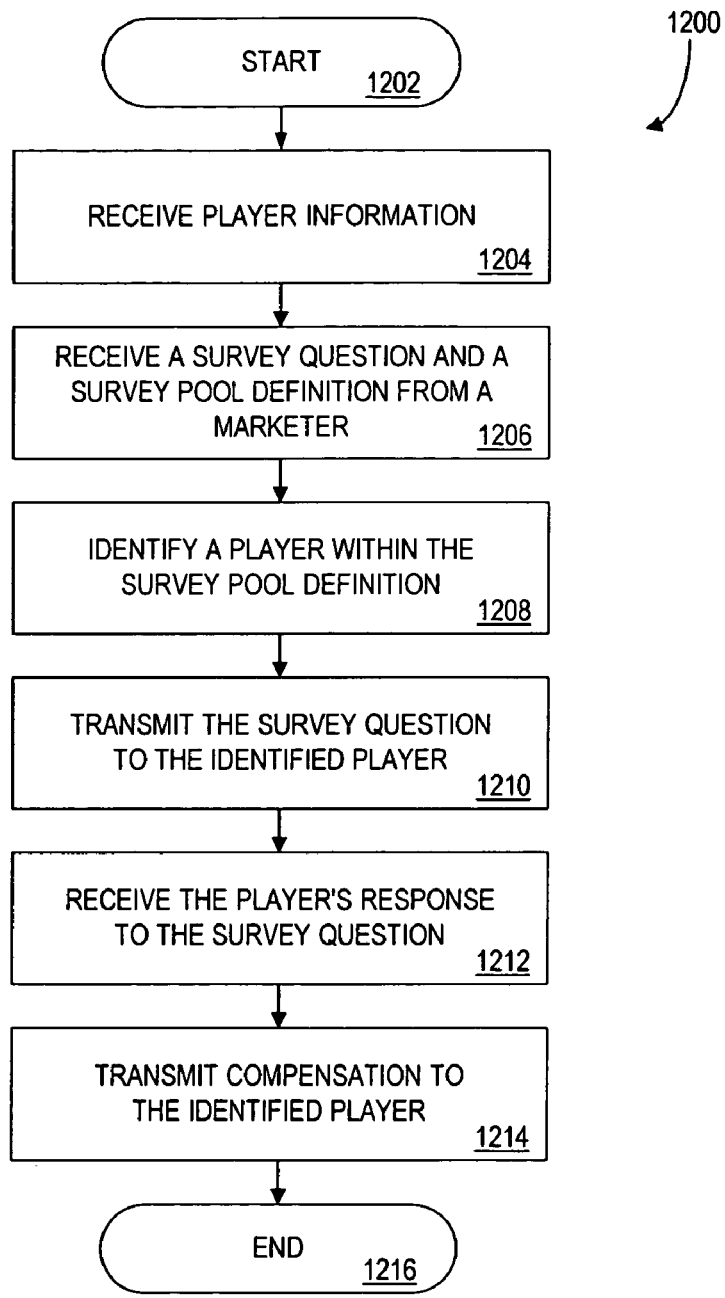
FIG. 12 depicts a flow diagram illustrating an exemplary embodiment of a method of marketing according to the present invention.

FIG. 12 depicts a flow diagram 1200 illustrating an exemplary embodiment of a method of marketing according to the present invention. It is important to note that the following technique is described from the point of view of the slot server 104. It will be apparent to those skilled in the relevant art, that alternative embodiments of the invention can be used within the scope of the present invention.

Flow diagram 1200 of the present invention illustrates an exemplary embodiment of a technique according to the present invention. Flow diagram 1200 illustrates steps performed from the perspective of slot server 104. Flow diagram 1200 illustratively can begin with step 1202 and can continue immediately with step 1204.

In step 1204, the slot server 104 receives player information from, e.g., the slot machine 102. Player information can be used to identify a player as a desirable candidate for a marketer. Thus, illustrative player information can include, e.g., a name, a mailing address, an email address, a phone number, a demographic, product preferences, and purchasing history. It will apparent to those skilled in the art that other useful player information could also be received. Player information, when received in one embodiment, can be kept on record in, e.g., the player database 302b, so that when a player provides identifying information, other information can be obtained from the player's record. For further information with respect to exemplary player database 302b, the reader is directed to the description above with reference to FIG. 7.

Player information, in one embodiment, can be received from a player via an optional player tracking card inserted into player tracking card reader 212 that can be included in the slot machine 102. For more information regarding a system that enables tracking player information and player inputs, the reader is directed to U.S. Pat. No. 5,429,361 to Raven, et al. for a "Gaming Machine Information, Communication and Display System," the contents of which are incorporated herein by reference in their entireties.

In another exemplary embodiment, the player can also provide player information through a survey. Alternatively, player information can be provided by a third party, such as by a casino employee who has observed the player. It will be apparent to those skilled in the art that player information can be obtained from other sources.

For example, player information can also be recorded using the player input device 210 by the slot machine 102. Information that can be recorded by slot machine 102 can include the player's wager amounts, cumulative losses, gambling history, etc. For more information regarding a system that enables collecting information about a gambler's playing session, the reader is directed to U.S. Pat. No. 5,249,800 to Hilgendorf, et al. for a "Progressive Gaming Control and Communication System," the contents of which are incorporated herein by reference their entireties. Player information can also be implied. For example, a player at a slot machine in Las Vegas is himself, physically in Las Vegas. In one exemplary embodiment the only player information received is the fact that a player is at a slot machine 102.

From step 1204, flow diagram 1200 can continue with step 1206.

In step 1206, in an exemplary embodiment, the slot server 104 can receive a survey question 604 and a survey pool definition 904 from the marketer.

The marketer at marketing terminal 108 can define a desired set of characteristics for the respondents. Such characteristics can be defined broadly or narrowly, and might include sex, height, nationality, age, place of birth, the name or other identifier of a particular person, or any other information that can be related to a person. The marketer can also define a desired number of respondents. The definition can specify a specific number or a range of satisfactory numbers of respondents. The marketer can specify a set of numbers, each number corresponding to the desired number of respondents with particular characteristics. Furthermore, the marketer can specify the number of respondents as those to whom a proposition is posed, or as those who actually respond. In some embodiments, the marketer selects from pre-defined survey pool definitions rather than explicitly defining the pools. The marketer can also submit one or more survey questions for its desired respondents to answer. Alternatively, the marketer could submit an indication of a survey question that is already stored with the slot server 104 or with the slot machine 102.

In addition, the marketer can submit an offer of compensation to the slot server 104 in return for conducting the survey. The offer can be to compensate the slot server 104, e.g., on a per question basis, on a per respondent basis, or according to the value of the responses. Furthermore, the offer can be divided into how much the slot server 104 is to be compensated, and how much the respondent is to be compensated. Exemplary questions database 302*a* described further above with reference to FIG. 6 lists an illustrative per-question compensation to the player and cost to the marketer.

From step 1206, flow diagram 1200 can continue with step 1208.

In step 1208, in an exemplary embodiment, the slot server 104 can identify a player within the survey pool definition.

The slot server 104 can match player information in the player database 302*b* described above with reference to FIG. 7 to a marketer's survey pool definition in the marketer database 302*d* illustratively depicted and described above with reference with FIG. 9. If the information matches, then the player can be considered for receiving the survey question. For example, if a particular marketer client's survey pool definition targets a respondent between 25 and 35 years of age, and Joe Smith is 30 years of age, then Joe Smith can be eligible to take the particular marketer client's survey.

The slot server 104 can impose additional constraints on selecting players beyond the constraints of meeting a marketer's survey pool definitions. For example, the slot server 104 can select for surveys only players that have lost a certain amount of money. Such players may be more likely to agree to complete surveys, and the compensation given to the players can ultimately find its way back to the casino operating slot server 104. The slot server 104 in one embodiment can disclose these additional constraints to the marketer.

A number of scenarios can arise that add complication to the matching process. Namely, one player can fit criteria for multiple survey pools, more players can be eligible for a survey than are desired, or fewer players can be eligible for a survey than desired. Where one player meets the criteria for multiple survey pools, a prioritization system can determine the first pool to which the player is assigned. For example, the player could be assigned to the pool of the marketer with the nearest deadline for the completion of the survey. Alternatively, the player could be assigned to the pool that provided the greatest level of compensation. As will be apparent to those skilled in the relevant art, many other prioritization schemes are also possible.

Where more players are eligible for a survey than, e.g., are desired by the marketer, a second prioritization system can determine those players who will be offered the survey. In one embodiment, players can be randomly selected until the survey pool is filled. In another embodiment, those players who have lost the most amount of money in the current gambling session can be chosen. In a third embodiment, players can be assigned to the survey pool that is least likely to be filled. For example, if a first pool requires people who are at least seventy years old, and a second pool requires only that a person be a man, a man aged seventy-one might be more advantageously assigned to the first pool than to the second pool. Again, as will be apparent to those skilled in the relevant arts, many other prioritization schemes can be used according to other exemplary embodiments of the invention.

Where not enough players are available to fill a survey pool, or not enough players have agreed to take the survey, the slot server 104 can take a number of courses of action. For example, the slot server 104 can negotiate with the marketer to get the marketer to expand the survey pool definition. For example, if the marketer originally wanted a survey involving single women aged 45–50, the slot server 104 could ask the marketer to also allow women aged 50–55, or can ask the marketer to allow married women as well as single women. The slot server 104 can alternatively ask the marketer to extend the deadline for the completion of the survey according to another exemplary embodiment of the invention. In another exemplary embodiment, the slot server 104 can survey as many players as possible, short of the desired pool size, and can submit incomplete survey results to the marketer. In another exemplary embodiment, the slot server 104 can charge the marketer less for the incomplete results. Finally, if players have simply not agreed to participate, the players can be offered greater compensation to change their minds and participate in another exemplary embodiment.

From step 1208, flow diagram 1200 can continue with step 1210.

In step 1210, in an exemplary embodiment, the slot server 104 can transmit survey questions to the identified player at slot machine 102.

In one embodiment, survey questions can be transmitted via an Internet or other network 106 link coupling the slot server 104 to the identified player's slot machine 102. A number of other modes of transmission are also possible. The slot machine 102 can then display the survey questions to the player at the slot machine 102 using display screen 202. An exemplary embodiment illustrative of one possible configuration of slot machine 102 is shown in FIG. 2. Alternatively, slot machine 102 can, e.g., audibly, or by other means, communicate the questions to the player.

In an exemplary embodiment, prior to giving the player survey questions, the slot machine 102 can ask the player whether or not the player wishes to participate in the survey. The slot machine 102 can also communicate to the player an offer of compensation in return for participating in the survey. The slot machine 102 can further communicate conditions necessary for participating in the survey. For example, the player could be informed that the player must answer questions truthfully and thoughtfully. In an exemplary embodiment, if the player does not agree to participate in the survey, the slot machine 102 can so inform the slot server 104, and the slot server 104 can then select a substitute player to participate in the survey. In one exemplary embodiment, a slot machine 102 provides a different offer of compensation to a player who has declined to participate in a survey, in the hopes of garnering the player's agreement. In another exemplary embodiment, players may be invited to participate in surveys only if they have previously indicated a willingness to do so, e.g., by opting in. In this embodiment there would thus be no need to ask whether the players desire to participate.

From step 1210, flow diagram 1200 can continue with step 1212.

In step 1212, in an exemplary embodiment, the slot server 104 can receive responses to the survey questions from the identified player.

Various exemplary embodiments illustrative of methods that the player can use to respond to surveys follow. These methods can include, for example, keying in answers to a player input device 210 (such as via a touch-screen or keypad), voicing answers into a microphone, or motioning answers into a camera, any of which can be coupled to the slot machine 102. The reader is directed to U.S. Pat. No. 5,374,952 to Flohr, for a "Videoconferencing System," the contents of which are incorporated herein by reference in their entireties, for further information regarding a system enabling video communication among a plurality of computing devices. The player input device 210, coupled to the slot machine 102, in illustrative exemplary embodiments can include, for example, a standard "QWERTY" keyboard, a Dvorak keyboard, a numeric keypad or can include a keyboard having only a small number of keys such as, e.g., a "T" key and an "F" key for answering true and false questions, respectively.

The slot machine 102 (or other compensation dispensing machine) can receive the responses from the player and then transmit the responses to the slot server 104. Transmission of responses can occur via an Internet link or other network link 106, or via a number of other modes of communication including, a wired network or a wireless network.

From step 1212, flow diagram 1200 can continue with step 1214.

In step 1214, in an exemplary embodiment, the slot server 104 can transmit a signal to provide a tangible benefit to the player as compensation for answering the question.

After receiving the player's responses to the survey questions, the slot server 104 can transmit a signal to the slot machine 102 authorizing the slot machine 102 to compensate the player using, e.g., the compensation dispensing device 214 coupled to the slot machine 102. The signal transmitted can include instructions on how much or what form of compensation should be dispensed the player. A database, such as the questions database of FIG. 6, can indicate to the slot server 104 how much compensation should be provided to the player. Compensation, in an exemplary embodiment, can include, cash, credits, gambling tokens, increased odds of winning, increased prize tables, insurance against losses, the ability to play dollar machines for a quarter, the free use of an extra coin in a multi-coin machine, the ability to play for free, having winnings rounded to a higher level (e.g. $85 rounded to $100), and auxiliary benefits, such as free or subsidized meals or hotel rooms.

The amount of compensation dispensed, in one exemplary embodiment, can suffice to reduce or eliminate a player's gambling losses, whether for the present gambling session, for a certain number of gambling sessions for a certain time period, etc. Such losses can be tracked via the player tracking card 212, a record of a slot machine 102 session, or via the observation of a player by casino employees. The prospect of eliminating gambling losses already incurred can be a powerful motivating force for a player to participate in surveys.

Compensation, in an exemplary embodiment, can incorporate marketing techniques. For example, a player who agrees to test-drive a Mercedes can increase the player's chances of winning by enabling a new payline on the slot machine 102. The payline, in an exemplary embodiment, can clearly indicate the sponsorship of Mercedes, effectively becoming a Mercedes payline. Alternatively, in another exemplary embodiment, Mercedes symbols on the slot machine 102 can become valuable should they line up along a payline. In general, in an exemplary embodiment, marketers can curry favor with players by having their names or brands associated with prizes on the slot machine 102.

In an exemplary embodiment, a player who does not agree to watch a Mercedes ad can still view the Mercedes payline. In an exemplary embodiment, the slot machine 102 can pointedly direct the player's attention to a symbol set that could have paid the player money had the player had access to the Mercedes payline. Additionally, when a winning symbol set does occur across a payline, (e.g., an MCI payline), the player can retroactively activate the payline, e.g., by agreeing to switch the player's long distance to MCI, and can thereby obtain the prize on the MCI payline.

In other exemplary embodiments, compensation can depend on the thoroughness or the value of the answer. For example, in one exemplary embodiment, a player might not be compensated as much for a one-word answer as for a one-paragraph answer. In an exemplary embodiment, the player's answer might be evaluated subjectively by the marketer or by the slot server 104, or can be evaluated by either according to an objective set of rules. To assist in evaluating or monitoring a player to determine to whether the player is paying sufficient attention to the question, the reader is directed, e.g., to U.S. Pat. No. 5,971,850 to Liverance "Game Apparatus Having Incentive Producing Means," the contents of which are incorporated herein by reference in their entirety.

From step 1214, flow diagram 1200 can continue with step 1216.

In step 1216, in an exemplary embodiment, flow diagram can immediately end.

Alternative Marketing Programs

An exemplary embodiment of the present invention has been described with respect to an exemplary method operative to provide marketing programs and in particular, operative to administer surveys. However, as will be apparent to those skilled in the art, the present invention can be applied equally to other marketing programs including for example, advertisements, and also to player commitments. For example, a player can be compensated for viewing advertisements on a slot machine 102. Similarly, a player can be compensated for listening to a presentation. For example, a presentation by a telecommunications service provider may present an offer to sign up for service via the slot machine 102. The player may then commit to switching telecommunications service providers via the slot machine 102. In another exemplary embodiment, a player can commit to filling out a survey in the future, using a slot machine 102 or other compensation dispensing device to fill out the survey, at a location proximate to the slot machine 102, or elsewhere. In particular, in one exemplary embodiment, players can be offered compensation for making commitments only after having lost a quantity of money. The quantity of money need not be fixed, in an exemplary embodiment, but can depend on the player's bet size, the duration of the betting session, the time of day, the desirability of the player from a marketer's point of view, and so on.

Features of Product Fulfillment

In one exemplary embodiment, where a player makes a commitment to buy or to sample a product as part of a response, the slot machine 102 can transmit a signal or notice of the commitment to the slot server 104. The slot server 104 can then transmit the notice to the product fulfillment branch 110. The reader is directed to the description with reference to FIG. 5, above. The notice can include player identifying information such as, a name 704 and the player's address 1002. The product fulfillment branch 110 can include a large warehouse of products, or a central entity in communication with a number of product merchants. In one exemplary embodiment, after receiving notice of a player's commitment, the product fulfillment branch 110 can arrange for the player to receive the product for which he has committed. The slot server 104 or the marketer at marketer terminal 108 can then compensate the product fulfillment branch 110. Alternatively, the slot server 104 can transmit the player's financial account information to the product fulfillment branch 110, so that the product fulfillment branch 110 can charge the player on its own. It will be apparent to those skilled in the art that product fulfillment branch 110 need not fulfill products but could fulfill any type of good or service intended to be delivered to the player.

Exemplary Player Commitments and Compensation

In an exemplary embodiment, a player can respond to a question by providing a commitment. In an exemplary embodiment, an exemplary commitment for which a player can be compensated can involve the player signing up for a good or service such as a new credit card, and then transferring the player's gambling debt onto the balance of the new credit card.

In another exemplary embodiment, another commitment for which a player can be compensated can include, e.g., sampling a product. In one exemplary embodiment, such a product can be brought immediately to the player at the player's slot machine 102. For example, if a player agrees to sample a particular imported beer, a waitress can bring the beer immediately to the player. Alternatively, in another exemplary embodiment, the product can be brought to the player's hotel room. In another exemplary embodiment, the sampled product can be charged to a credit card previously provided by the player (and stored in player database 302B) should the player not explicitly decline to purchase the product.

In another exemplary embodiment, another exemplary commitment for which the player can be compensated can include agreeing to make an additional number of slot machine 102 pulls such as a fixed number of slot pulls.

In one exemplary embodiment, a slot machine 102 can run automatically without the player's paying so long as a player continues to answer questions. In this embodiment, there can be some minimum rate at which the player must continue to answer questions.

In an exemplary embodiment, compensation can be delivered to the player in a manner that stimulates player involvement and interest. For example a player who has earned compensation by filling out a survey can receive the compensation intermittently, such as at a time when the player might otherwise want to leave.

In another exemplary embodiment, to give players incentive to answer questions, the slot reels might not stop spinning until a player answers a particular question.

In yet another exemplary embodiment, a special prize (such as a large jackpot) can become available only for those players who participate in a survey. In an exemplary embodiment, the slot server 104 can add money to a progressive jackpot for every survey a player fills out, and can give the player one or more extra chances to win the progressive jackpot.

Alternative Compensation Dispensing Machines

An exemplary embodiment of the present invention has been described above in relation to slot machines 102. However, as will be apparent to those skilled in the art, the present invention can also apply to any compensation dispensing device that is capable of dispensing immediate and tangible rewards. Exemplary embodiments of compensation dispensing devices include, e.g., automated teller machines (ATMs), point-of-sale (POS) terminals, and vending machines which are capable of dispensing cash and other forms of compensation such as food, products, goods and other tangible compensation. In yet other exemplary embodiments, digital audio, digital music and digital video dispensing devices may dispense audio, music and video. Kiosks can be capable of dispensing such things as, e.g., tickets. The slot machine 102 can be hand-held and portable in one exemplary embodiment.

In an exemplary embodiment, the compensation dispensing machines, e.g., slot machines 102, or the slot server 104, can be coupled to microphones capable of measuring the noise levels at different places in a casino. Then, if the survey requires audio questions or verbal responses, the slot server 104 can select players for surveys based in part on their ability to hear the questions or on the ability of the slot machine 102 to record the player's answers in the presence of noise. Even if audio is not involved, in another exemplary embodiment, players can still be selected based on the degree to which background noise might distract them from the survey process.

Survey Timing

In another exemplary embodiment, players can be asked survey questions in a manner meant to avoid lost revenues for the casino, and preferably can be limited to only this method of questioning in an exemplary embodiment. A potential concern for the casino can be that time spent answering survey questions is time not spent gambling. Thus, in one exemplary embodiment, a player can be asked survey questions during breaks in play such as when the player's slot machine 102 is dropping coins into the slot machine's tray, when the reels of the slot machine 102 are spinning, or when the coin hopper of the slot machine 102 is being refilled. In one exemplary embodiment, the player can put the slot machine 102 into an automatic spin mode while answering survey questions, so as to gamble and answer questions simultaneously. In another embodiment the reels do not stop spinning until the player answers the question. In another embodiment the questions are asked when coins are falling into the payout tray. This is an example of a time period that may be deemed an appropriate time to ask the player questions without interrupting his play.

In another exemplary embodiment to the present invention, the slot server 104, can give players the opportunity to answer surveys at particular times of the day, and preferably in one exemplary embodiment surveying can be restricted to only particular times. For example, during times of high customer traffic, in an exemplary embodiment, surveys might not serve as a significant source of revenue for a casino. During such times of high customer traffic, the slot machine 102 can be provided for conventional play only. By comparison, during times of low customer traffic, the present invention can be used to generate additional income from under-utilized slot machines 102.

Survey Response Quality

The present invention in an exemplary embodiment can include features to aid in ensuring high quality level of responses of the present invention. In an exemplary embodiment, players can be limited to a certain number of surveys per time duration, e.g., per day, so as to prevent the players from becoming biased or "professional" survey takers.

Players who have been observed to have had many drinks during a session can also be considered to be biased. In one embodiment, the slot server 104 can communicate to the marketer information related to a player's bias.

In an exemplary embodiment, slot machines 102 can be equipped to detect whether a player is paying attention to a survey or advertisement. For example, in exemplary embodiments, a camera can be used to track a player's gaze, biometric equipment can track physiological responses, and timers can track the regularity of the player's responses. The applicants have already disclosed methods for verifying adequate attention to a task by a player. In an exemplary embodiment, the player might not receive full compensation or be otherwise penalized if the player is determined not to be paying adequate attention.

In an exemplary embodiment, the slot server 104 can monitor players, but, in one exemplary embodiment, does not impose penalties on its own. The slot server 104, however, in an exemplary embodiment, can submit to marketers, records of the player taking the survey. For example, if a marketer wishes to watch the player taking the survey, the slot server 104 can provide to the marketer video tapes of the player. In exemplary embodiments, the marketer can use marketer terminal 108 to request verifications. Exemplary verifications can include requesting to verify the player's attentiveness or a requesting to verify the player's age information.

Many casinos already use cameras extensively in order to discourage players from cheating. Such casino cameras are often attached to the ceiling. In an exemplary embodiment of the present invention, where this invention employs cameras, the cameras could just as easily be separate from the slot machines as they could be built in.

In an additional exemplary embodiment, an additional way of encouraging the player to pay attention during viewing of an advertisement can include a technique by which the slot machine 102 can periodically pose to the player questions relevant to the advertisement, and can reward correct responses with compensation such as a cash pay out.

In another exemplary embodiment, a player who has received compensation in exchange for committing a block of time (e.g. for answering a survey or for watching an advertisement) can be prevented from leaving during that block of time. For example, a player's compensation can include playing a slot machine automatically with an increased prize table, during which time the player is to watch, e.g., an advertisement for a cruise or other vacation product. Should the player win a large prize, in an exemplary embodiment, the player is prevented from leaving with his winnings until the advertisement has ended. The slot machine 102 prevents the player from leaving, for example, by not paying out any coins until the advertisement is over. Alternatively, a player's financial account, or gambling credit account can be charged should he leave early.

Target Marketing to Players

In an exemplary embodiment, a marketer, or the slot server 104, might want questions to be asked of a particular player, or type of player identified by particular demographics or identifiable features or attributes. Questions can then be prepared for rapid delivery to the targeted player, should the targeted player ever sit down at a slot machine 102. Thus, when the player appears at a slot machine 102, in an exemplary embodiment, rather than searching for an appropriate survey pool to place him in, the slot server 104 immediately delivers the questions to him. Alternatively, the questions can be associated with the player's player tracking card, and can later be asked by the player's next slot machine 102 without the intermediation of the slot server 104.

In an exemplary embodiment, a marketer can view player information for one or more players, and can tailor questions towards those players rather than first asking questions and hoping the right survey pool is filled.

In other exemplary embodiments, a plurality of marketers can accept the same answer from the same player for the same question. This feature can allow, for example, an excess of marketers to have their surveys completed.

In an exemplary embodiment, survey questions from a plurality of marketers can be intermingled when given to a player.

In an exemplary embodiment, even before a marketer can submit a survey question or a survey pool definition, a central server or slot server 104 can transmit questions to players. The players' answers can then be stored and provided to marketers who later submit questions matching those already asked, and whose survey pool definitions encompass the players already surveyed.

In an exemplary embodiment, the potential to earn money through survey questions can be given as a reward to players for a number of behaviors, including maintaining a certain frequency of slot pulls or betting a certain amount, for example.

In an exemplary embodiment, the slot server 104 and the marketer can be the same entity.

In an exemplary embodiment, in addition to providing survey questions, marketers can provide rules for administering the questions. For example, depending on the answer to a first question a second question or a third question can be asked. In an exemplary embodiment, new survey questions can be generated dynamically based on prior responses. In an exemplary embodiment, the questions can be generated by, e.g., a program, or by a person.

In an exemplary embodiment, survey questions can themselves define a survey pool. For example, a marketer might ask for an age with a first question, and can then provide a particular series of questions to the pool of respondents who gave an age greater than 50 years old, for example.

Aggregation of Results

In an exemplary embodiment, the present invention can include additional steps of aggregating survey answers before presenting the answers to a marketer. For example, a plurality of positive answers such as, e.g., "I prefer Brand X laundry detergent" or "Brand X laundry detergent is the best for removing stains" can be grouped into an aggregated result or statistic, such as "78% prefer Brand X laundry detergent." In an exemplary embodiment, the statistic is then transmitted to the marketer in lieu of sending a plurality of individual responses.

In an exemplary embodiment, the present invention can include the additional step of receiving compensation from the marketer in return for conducting a survey. For example, a casino, or service provider owning the slot server 104, can be compensated in addition to the players being compensated in an exemplary embodiment. Such compensation might take the form of a per question fee, per respondent fee, per survey fee, monthly fixed payment etc.

Insurance Offerings

In an exemplary embodiment, the marketer might want to offer a player an uncertain compensation, but may not want to bear the risk associated with such an offer. For example, the marketer might want to double the top prize payout. However, the marketer might not want to pay out an additional million dollars if the player wins a million-dollar jackpot. Therefore the marketer can pay the casino, through the slot server 104, e.g., a fixed amount of money in order for the casino to assume the burden of doubling the top prize payout. The fixed amount can be determined by calculating the player's expected additional prizes resulting from the doubled prize table. In another embodiment, the marketer can pay an insurance provider to assume the risk of doubling the top prize payout.

Player Information and Tracking Card

In an exemplary embodiment, the player tracking card can serve other functions outside of a casino. For example, in an exemplary embodiment, the player tracking card can serve as a frequent shopper card. Thus, any information contained on the player tracking card that is used in its frequent shopper card capacity, such as in determining what groceries the player buys, can also be used to identify players who are desirable for a particular survey. The same information can be used to add weight to a particular answer. For example, a player who buys dog food can weigh more heavily with a marketer on questions relating to dogs. In exemplary embodiments that employ point-of-sale (POS) terminals, a frequent shopper card can serve as the primary means of obtaining player information for surveys.

In an exemplary embodiment, a slot machine 102 can request player information prior to asking survey questions.

In an exemplary embodiment, players can be paid to increase the balance on casino stored value cards. In an exemplary embodiment, this could provide marketers with more information about a player's financial status.

Gaining a Player's Agreement to Be Surveyed

In an exemplary embodiment, if a slot machine 102 has asked a player whether he wishes to participate in a survey, and the player has declined, then a negotiation process can commence where the slot machine 102 attempts to induce the player to change his mind and participate. In one embodiment, the slot machine 102 repeatedly displays compensation offers until the player agrees to accept the compensation in exchange for participating in the survey. In an exemplary embodiment, the slot machine 102 might store a rules database indicating what offers to display in light of the player's information and gambling history, the survey requirements, the likelihood of other qualified players being found, the profit margin on the survey, other offers previously accepted or declined by the player, and the like. In an exemplary embodiment, once the player has declined a specified number of times, new offers might be prevented from being presented.

In another exemplary embodiment, rather than presenting particular offers, the slot machine 102 can provide the player a means to indicate suitable offers. For example, the slot machine 102 could allow a player to select between receiving cash or receiving free plays. If the player then chooses free plays, the slot machine 102 can ask the player how many free plays, or can begin making offers of particular numbers of free plays.

In still another exemplary embodiment, the player can have the opportunity to specify a desired compensation, after which the slot machine 102 can inform the player of what he must do in return. The player can then either accept the offer, or can modify his desired compensation, after which the process can repeat.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method comprising:
    determining a gambling history of a player;
    selecting the player to receive a survey question based on the gambling history;
    transmitting the survey question to the player via a slot machine;
    receiving a response of the player to the survey question;
    determining, by a processing device, compensation for the response; and
    after receiving the response, transmitting a signal to the slot machine to provide the determined compensation to the player.

2. The method of claim 1, in which selecting the player comprises:
    determining an amount lost gambling by the player; and
    selecting the player based on the amount lost gambling.

3. The method of claim 2, in which determining the amount lost gambling by the player comprises:
    determining an amount lost gambling by the player over a plurality of gambling sessions.

4. The method of claim 2, in which selecting the player based on the amount lost gambling comprises:
    selecting the player if the amount lost gambling is not less than a predetermined amount,
    the predetermined amount being greater than zero.

5. The method of claim 1, in which the determined compensation comprises offsetting a gambling loss of the player.

6. The method of claim 1, in which the determined compensation comprises erasing a gambling loss of the player.

7. The method of claim 1, in which the determined compensation comprises participation in a game of chance.

8. The method of claim 1, in which the determined compensation comprises participation in a game of skill.

9. The method of claim 1, in which the determined compensation comprises a gambling token.

10. The method of claim 1, in which the determined compensation comprises an increase in odds of winning in a game of chance.

11. The method of claim 1, in which the determined compensation comprises an increased prize table.

12. The method of claim 1, in which the determined compensation comprises an insurance protection against a loss.

13. The method of claim 1, in which the determined compensation comprises an ability to play a higher denomination currency gaming machine for a lower denomination currency.

14. The method of claim 1, in which the determined compensation comprises a free use of an extra slot in a multi-slot slot machine.

15. The method of claim 1, in which the determined compensation comprises an ability to play the slot machine for free.

16. The method of claim 1, in which the determined compensation comprises an ability to have winnings rounded up to a higher level.

17. The method of claim 1, in which the determined compensation comprises a free room.

18. The method of claim 1, in which the determined compensation comprises a subsidized room.

19. The method of claim 1, in which the determined compensation comprises activating an inactive payline.

20. The method of claim 1, in which the determined compensation comprises allowing the player to receive a prize corresponding to an outcome on an inactive payline.

21. The method of claim 1, in which the determined compensation comprises retroactively activating a payline in exchange for gambling plays.

22. The method of claim 1, in which the determined compensation comprises cash.

23. The method of claim 1, in which the determined compensation comprises credit.

24. The method of claim 1, in which the determined compensation comprises placing an advertising logo on a payline of the slot machine.

25. The method of claim 1, in which transmitting the survey question comprises:
    determining that the player is losing; and
    transmitting the survey question in response to determining that the player is losing.

26. The method of claim 1, in which transmitting the survey question comprises:
  determining that a reel of the slot machine is spinning; and
  transmitting the survey question in response to determining that the reel of the slot machine is spinning.

27. The method of claim 1, in which transmitting the survey question comprises:
  determining that a coin is dropping at the slot machine; and
  transmitting the survey question in response to determining that the coin is dropping at the slot machine.

28. The method of claim 1, further comprising:
  generating an offer to the player based on the gambling history.

29. The method of claim 28, further comprising:
  presenting the offer to the player.

30. The method of claim 1, further comprising:
  displaying an advertisement to the player via the slot machine, and
  in which the survey question is about the advertisement.

31. The method of claim 1, in which the response comprises a commitment.

32. The method of claim 1, in which transmitting the signal comprises transmitting the signal at a time proximate to receipt of the response.

33. A computer readable medium storing instructions configured to direct a processor to perform a method comprising:
  determining a gambling history of a player;
  selecting the player to receive a survey question based on the gambling history;
  transmitting the survey question to the player via a slot machine;
  receiving a response of the player to the survey question;
  determining compensation for the response; and
  after receiving the response, transmitting a signal to the slot machine to provide the determined compensation to the player.

34. An apparatus comprising:
  a processor; and
  a computer readable medium in communication with the processor, the computer readable medium storing instructions configured to direct the processor to perform a method comprising:
  determining a gambling history of a player;
  selecting the player to receive a survey question based on the gambling history;
  transmitting the survey question to the player via a slot machine;
  receiving a response of the player to the survey question;
  determining compensation for the response; and
  after receiving the response, transmitting a signal to the slot machine to provide the determined compensation to the player.

* * * * *